US012681331B2

(12) United States Patent
Kawakami et al.

(10) Patent No.: US 12,681,331 B2
(45) Date of Patent: Jul. 14, 2026

(54) ELECTROCHROMIC ELEMENT AND LENS FOR SPECTACLES

(71) Applicant: HOYA LENS THAILAND LTD., Prachatipat (TH)

(72) Inventors: Hironori Kawakami, Tokyo (JP); Shigeki Miyazaki, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 295 days.

(21) Appl. No.: 18/560,736

(22) PCT Filed: May 17, 2022

(86) PCT No.: PCT/JP2022/020522
§ 371 (c)(1),
(2) Date: Nov. 14, 2023

(87) PCT Pub. No.: WO2022/244770
PCT Pub. Date: Nov. 24, 2022

(65) Prior Publication Data
US 2024/0168314 A1 May 23, 2024

(30) Foreign Application Priority Data
May 17, 2021 (JP) ................................. 2021-082861

(51) Int. Cl.
*G02C 7/10* (2006.01)
*G02F 1/153* (2006.01)
*G02F 1/155* (2006.01)

(52) U.S. Cl.
CPC ........... *G02C 7/101* (2013.01); *G02F 1/1533* (2013.01); *G02F 1/155* (2013.01)

(58) Field of Classification Search
CPC ....... G02C 7/101; G02F 1/1533; G02F 1/155; G02F 2001/1536; G02F 1/153; G02F 1/161
(Continued)

(56) References Cited

U.S. PATENT DOCUMENTS 5,668,663 A * 9/1997 Varaprasad ............. B32B 17/06
359/603
10,254,617 B2 * 4/2019 Gauthier ................. G02F 1/161
(Continued)

FOREIGN PATENT DOCUMENTS

CN 112147827 A 12/2020
JP 2004-271716 A 9/2004
(Continued)

OTHER PUBLICATIONS

Jul. 26, 2022 International Search Report issued in International Patent Application No. PCT/JP2022/020522.
(Continued)

*Primary Examiner* — Tuyen Tra
(74) *Attorney, Agent, or Firm* — Oliff PLC

(57) ABSTRACT

An electrochromic element in which a decrease in responsiveness is minimized by making a side of the electrochromic element have gas barrier properties, and a lens for spectacles, the electrochromic element including a pair of electrode layers and an electrochromic layer arranged between the electrode layers, wherein a barrier layer surrounding the electrochromic layer is provided.

4 Claims, 2 Drawing Sheets

(58) Field of Classification Search
USPC ................................. 351/41, 159.01, 159.39
See application file for complete search history.

(56) References Cited

U.S. PATENT DOCUMENTS

| | | |
|---|---|---|
| 2003/0052838 A1 | 3/2003 | Kim et al. |
| 2018/0017835 A1 | 1/2018 | Kim et al. |
| 2018/0101080 A1 | 4/2018 | Gauthier et al. |

FOREIGN PATENT DOCUMENTS

| | | |
|---|---|---|
| JP | 2005-503586 A | 2/2005 |
| JP | 2017-111389 A | 6/2017 |
| JP | 2018-010106 A | 1/2018 |

OTHER PUBLICATIONS

Jul. 26, 2022 Written Opinion issued in International Patent Application No. PCT/JP2022/020522.
May 21, 2024 Office Action issued in Japanese Patent Application No. 2023-522674.
Apr. 28, 2025 Extended European Search Report issued in European Patent Application No. 22804681.9.
Jan. 28, 2025 Office Action issued in Japanese Patent Application No. 2023-522674.

* cited by examiner (a)                              (b)

ELECTROCHROMIC ELEMENT AND LENS FOR SPECTACLES

TECHNICAL FIELD

The present invention relates to an electrochromic element whose coloring and discoloring can be reversibly controlled by electricity and a lens for spectacles.

BACKGROUND ART

Electrochromic elements that utilize an electrochromism phenomenon in which a voltage is applied to cause a reversible oxidation-reduction reaction and colors are reversibly changed are used as, for example, lenses for spectacles. PTL 1 discloses an electrochromic element including a pair of substrates, an electrode layer arranged between the substrates and an electrochromic layer.

CITATION LIST

Patent Literature

[PTL 1] Japanese Patent Application Publication No. 2017-111389

SUMMARY OF INVENTION

Technical Problem

Incidentally, electrochromic elements are elements that utilize an electrochromism phenomenon in which a voltage is applied to both electrodes to cause a reversible oxidation-reduction reaction and colors are reversibly changed.

However, there is a problem in that the responsiveness decreases due to water or oxygen entering from the side of the electrochromic element.

The present invention has been made in order to address the above problems, and an objective of the present invention is to provide an electrochromic element in which a decrease in responsiveness is minimized by making a side of the electrochromic element have gas barrier properties, and a lens for spectacles.

Solution to Problem

An electrochromic element in the present invention is an electrochromic element that includes a pair of electrode layers and an electrochromic layer arranged between the electrode layers, wherein a barrier layer surrounding the electrochromic layer is provided.

In the present invention, preferably, the barrier layer has gas barrier properties and adhesive properties.

In the present invention, the electrochromic layer may be arranged between a pair of substrates each having the electrode layer on the inner surface, and a sealing layer for sealing between the pair of substrates and the barrier layer may be separately provided.

In the present invention, preferably, the barrier layer is formed of a high resistance material.

In the present invention, preferably, the barrier layer is formed of a UV curing resin, a thermosetting resin, or a low-melting-point material.

A lens for spectacles in the present invention includes the electrochromic element described above.

Advantageous Effects of Invention

According to the electrochromic element of the present invention, a barrier layer is provided around the electrochromic layer, and accordingly, it is possible to improve gas barrier properties and it is possible to obtain excellent responsiveness.

DESCRIPTION OF EMBODIMENTS

Hereinafter, a mode for implementing the present invention (hereinafter simply referred to as "the present embodiment") will be described in detail.

Problems in Conventional Electrochromic Element and Overview of Present Embodiment Electrochromic elements are elements that utilize an electrochromism phenomenon in which a voltage is applied to both electrodes to cause a reversible oxidation-reduction reaction and colors are reversibly changed. For example, electrochromic elements can be used as lenses for spectacles, and can function as sunglasses in bright places and clear lenses in dark places. It is possible to adjust the brightness to an optimal level by operating a switch or automatically.

The electrochromic element has a structure including a pair of electrode layers and an electrochromic layer arranged between the electrode layers.

Incidentally, when water or oxygen enters the electrochromic layer from the side of the electrochromic element, there is a problem that the responsiveness of color change due to an electrochromism phenomenon decreases such as a decrease in the reversibility of the oxidation-reduction reaction.

Therefore, the inventors conducted extensive studies and as a result, found that, when a barrier layer is arranged to surround the electrochromic element, penetration of water or oxygen into the electrochromic layer in a side direction is inhibited, and the responsiveness is improved. Hereinafter, the layer structure of the electrochromic element in the present embodiment will be described in detail.

Electrochromic Element 10 in First Embodiment

Figure 1:
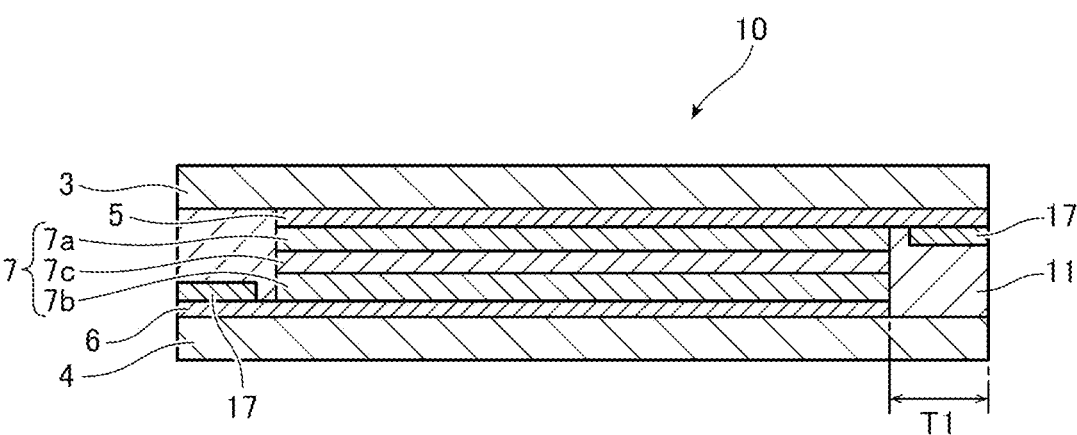
FIG. 1 is a schematic cross-sectional view of an electrochromic element according to a first embodiment of the present invention.

FIG. 1 is a schematic cross-sectional view of an electrochromic element 10 according to a first embodiment of the present invention.

The electrochromic element 10 includes a pair of a first substrate 3 and a second substrate 4, a pair of a first electrode layer 5 and a second electrode layer 6 provided on the inner surfaces of the first substrate 3 and the second substrate 4, and an electrochromic layer 7 provided between the first electrode layer 5 and the second electrode layer 6. The electrochromic layer 7 includes a reduction layer 7a arranged on the side of the first electrode layer 5, an oxidation layer 7b arranged on the side of the second electrode layer 6, and an electrolyte layer 7c provided between the reduction layer 7a and the oxidation layer 7b. In this manner, in the electrochromic element 10, the second substrate 4/the second electrode layer 6/the oxidation layer 7b/the electrolyte layer 7c/the reduction layer 7a/the first electrode layer 5/the first substrate 3 are laminated in order from the bottom of FIG. 1.

The electrochromic element 10 shown in FIG. 1 is in the form of a film, and can form, for example, a lens for spectacles in which the electrochromic film shown in FIG. 1 is adhered to the surface of a lens substrate (not shown). Alternatively, a lens for spectacles can be formed using the electrochromic element 10 shown in FIG. 1 with the first substrate 3 and the second substrate 4 as lens substrates.

Substrate, Electrode Layer, and Electrochromic Layer

The substrates 3 and 4 constituting the electrochromic element 10 are, for example, in the form of a film or sheet, and are required to be transparent and have high transmittance. The substrates 3 and 4 are, for example, resin substrates that can be molded in a mold such as a polycarbonate resin, an acrylic resin, an epoxy resin, and a phenolic resin and glass substrates. If the substrates 3 and 4 are formed of a polycarbonate resin, this is advantageous because transparency and high transmittance can be obtained and in terms of production cost.

Properties required for the electrode layers 5 and 6 constituting the electrochromic element 10 include transparency, high transmittance, and excellent conductivity. In order to satisfy such properties, the electrode layers 5 and 6 are transparent electrode layers, and an indium tin oxide (ITO) is particularly preferably used.

As shown in FIG. 1, parts of the first electrode layer 5 and the second electrode layer 6 extend to positions at which they overlap a barrier layer 11 to be described below, and at those positions, metal terminal parts 17 are formed on the electrode layers 5 and 6 in an overlapping manner. The metal terminal part 17 is exposed to the outside, and a voltage can be applied between the pair of electrode layers 5 and 6 through the metal terminal part 17.

For the reduction layer 7a, the oxidation layer 7b and the electrolyte layer 7c constituting the electrochromic layer 7, existing materials can be used.

The reduction layer 7a is a layer that develops colors according to a reduction reaction. For the reduction layer 7a, existing reduced electrochromic compounds can be used. It does not matter whether it is an organic substance or an inorganic substance, and although not limited, examples include azobenzene, anthraquinone, diarylethene, dihydroprene, dipyridine, styryl, styryl spiropyran, spirooxazine, spirothiopyran, thioindigo, tetrathiafulvalene, terephthalic acid, triphenylmethane, triphenylamine, naphthopyran, viologen, pyrazoline, phenazine, phenylenediamine, phenoxazine, phenothiazine, phthalocyanine, fluoran, fulgide, benzopyran, and metallocene substances, tungsten oxide, molybdenum oxide, iridium oxide, and titanium oxide.

The oxidation layer 7b is a layer that develops colors according to an oxidation reaction. For the oxidation layer 7b, existing oxidized electrochromic compounds can be used. It does not matter whether it is an organic substance or an inorganic substance, and although not limited, for example, it can be selected from among a composition containing a radically polymerizable compound including triarylamine, a Prussian blue type complex, nickel oxide, iridium oxide and the like.

The electrolyte layer 7c has electronic insulation and ionic conductivity and is preferably transparent. The electrolyte layer 7c may be a solid electrolyte, a gel, or a liquid. In order to maintain high ionic conductivity, a gel is preferable. Although not limited, for example, existing electrolyte materials such as inorganic ion salts such as alkali metal salts and alkaline earth metal salts, quaternary ammonium salts and acids can be used.

[Barrier Layer 11]

The barrier layer 11 will be described. As shown in FIG. 1, both ends of the pair of substrates 3 and 4 extend outward from the sides of the electrochromic layer 7, and the barrier layer 11 is provided between the pair of substrates 3 and 4 and around the electrochromic layer 7.

It is preferable that the barrier layer 11 have gas barrier properties and adhesive properties. Gas barrier properties can be evaluated by the water vapor transmission rate (WVTR) and the $O_2$ transmittance. Gas barrier properties can be measured using a dry/wet sensor (Lyssy) method, a Mocon (MOCON) method, a gas chromatography method, an API-MS method, a Ca corrosion method, and a differential pressure method. For example, the water vapor transmission rate and the $O_2$ transmittance are measured according to "Mocon method (JIS K 7129 (B))." In the present embodiment, the water vapor transmission rate (WVTR) under an atmosphere of a temperature of 40° C. and a humidity of 90% RH is 100 (g/m²·day) or less, preferably 80 (g/m²·day) or less, more preferably 60 (g/m²·day) or less, still more preferably 50 (g/m²·day) or less, yet more preferably 25 (g/m²·day) or less, yet more preferably 10 (g/m²·day) or less, yet more preferably 7 (g/m²·day) or less, and most preferably 5 (g/m²·day) or less. In addition, although the lower limit value of the water vapor transmission rate is not limited, for example, the lower limit value can be set to about 10-6 (g/m²·day). The $O_2$ transmittance under an atmosphere of a temperature of 20° C. and a humidity of 65% RH is preferably 70 (cc/m²·day·atm) or less, more preferably 60 (cc/m²·day·atm) or less, still more preferably 55 (cc/m²·day·atm) or less, yet more preferably 40 (cc/m²·day·atm) or less, yet more preferably 30 (cc/m²·day·atm) or less, yet more preferably 20 (cc/m²·day·atm) or less, and most preferably 15 (cc/m²·day·atm) or less.

In the present embodiment, it is necessary to satisfy at least the water vapor transmission rate between the water vapor transmission rate and the $O_2$ transmittance of the barrier layer 11, and it is preferable to satisfy both.

Figure 3:
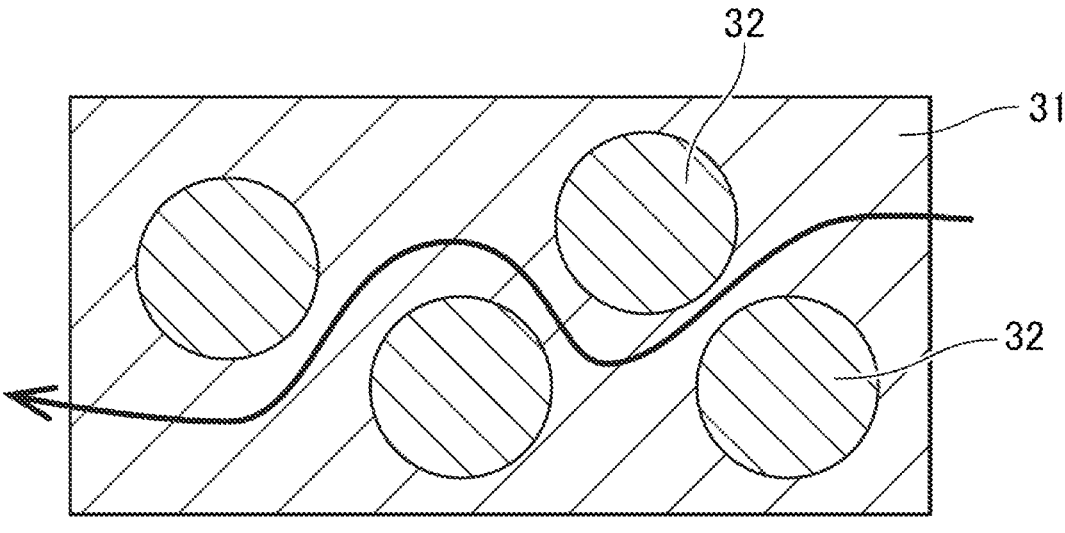
FIG. 3 is an enlarged schematic cross-sectional view of a barrier layer.

The barrier layer 11 is preferably formed of a material that can be patterned. For example, at least one of a UV curing resin, a thermosetting resin, a low-melting-point alloy, and a low-melting-point glass can be selected. A UV curing resin is preferable because it can be cured without requiring a high-temperature heat treatment. Specifically, acrylic resin, epoxy resin, silicone rubber materials and the like can be selected. Since all of these materials have excellent adhesive properties, in order for gas barrier properties to satisfy the above numerical value range, two or more types of materials may be mixed, or as shown in FIG. 3, a large number of inorganic fine particles 32 may be mixed into a resin material 31. Therefore, as shown in the arrow in FIG. 3, when a gas path passing from the right side in the drawing to the left side in the drawing extends, it is possible to improve gas barrier properties.

In addition, for the barrier layer 11, as an example, "Photolec E" (commercially available from Sekisui Chemical Co., Ltd.) or an active barrier sealing material (commercially available from SAES Getters S.p.A.) can be used.

The thickness of the barrier layer 11 is formed by the interval between the pair of substrates 3 and 4, and specifically, it is about 0.1 μm to 200 μm, preferably about 1 μm to 100 μm, and more preferably about 1 μm to 50 μm.

The barrier layer 11 has gas barrier properties and adhesive properties. That is, the barrier layer 11 also functions as a sealing layer that bonds the pair of substrates 3 and 4. "Adhesive properties" can be evaluated by the peel strength using, for example, a Tensilon tensile tester.

If the barrier layer 11 does not have adhesive properties, each of the substrates 3 and 4 and the barrier layer 11 are bonded, for example, with an adhesive layer (not shown) therebetween.

In addition, the barrier layer 11 is preferably formed of a high resistance material. The barrier layer 11 has a higher electrical resistivity than the electrode layers 5 and 6. The electrical resistivity of the barrier layer 11 is preferably 500 Ω·cm or more and more preferably 1 kΩ·cm or more. In this manner, when the electrical resistivity of the barrier layer 11 increases, it is possible to prevent a leakage current between the electrode layers 5 and 6 through the barrier layer 11.

When the width T1 of the barrier layer 11 is wider, adhesive properties (seal strength) can be better. Therefore, as shown in FIG. 1, the barrier layer 11 is brought into contact with the side of the electrochromic layer 7 or the gap between the electrochromic layer 7 and the barrier layer 11 is made as narrow as possible. In this manner, it is preferable to widen the width T1 of the barrier layer 11 in order to improve adhesive properties. Although not limited, the width T1 of the barrier layer 11 is about 0.5 mm to 3.0 mm.

In addition, it is preferable that the barrier layer 11 have transparency depending on usage applications and forms. For example, in applications of the lens for spectacles, when the position of the barrier layer 11 is exactly at the frame position, the barrier layer 11 does not necessarily have to be transparent. However, it is preferable that the barrier layer 11 be transparent depending on the part in which the barrier layer 11 does not cover the frame or other applications. "Transparency" means a state of being transparent in a visible range and can be defined by the absorbance in the visible range. For example, the absorbance in the visible range measured using an UV-VIS-NIR spectrophotometer UH4150 (commercially available from Hitachi High-Tech Science Corporation) at a wavelength of 400 to 750 mm is preferably 0.1 Abs or less and more preferably 0.09 Abs or less.

In addition, the "transparency" of the barrier layer 11 means that light is not scattered and can be defined by the haze. Generally, the haze can be determined by measuring the total light transmittance and the diffuse transmittance of the barrier layer 11 using an integrating sphere light transmittance measurement device and according to the following formula.

$$\text{haze value (\%)}=\text{diffuse transmittance (\%)/total light transmittance (\%)}\times100$$

Here, the diffuse transmittance is a value obtained by subtracting the parallel light transmittance from the total light transmittance.

In the present embodiment, the haze value is 30% or less, preferably 20% or less, more preferably 10% or less, and still more preferably 1% or less.

The transparency of the barrier layer 11 preferably satisfies both the visible absorbance and the haze.

In the first embodiment shown in FIG. 1, the barrier layer 11 is formed between the pair of substrates 3 and 4 and around the electrochromic layer 7. Therefore, it is possible to prevent water or oxygen from entering the electrochromic layer 7 from the side of the electrochromic element 10 and it is possible to obtain good responsiveness. In addition, since the barrier layer 11 has better adhesive properties, the pair of substrates 3 and 4 can be reliably bonded to each other.

Electrochromic Element 20 in Second Embodiment

Figure 2:
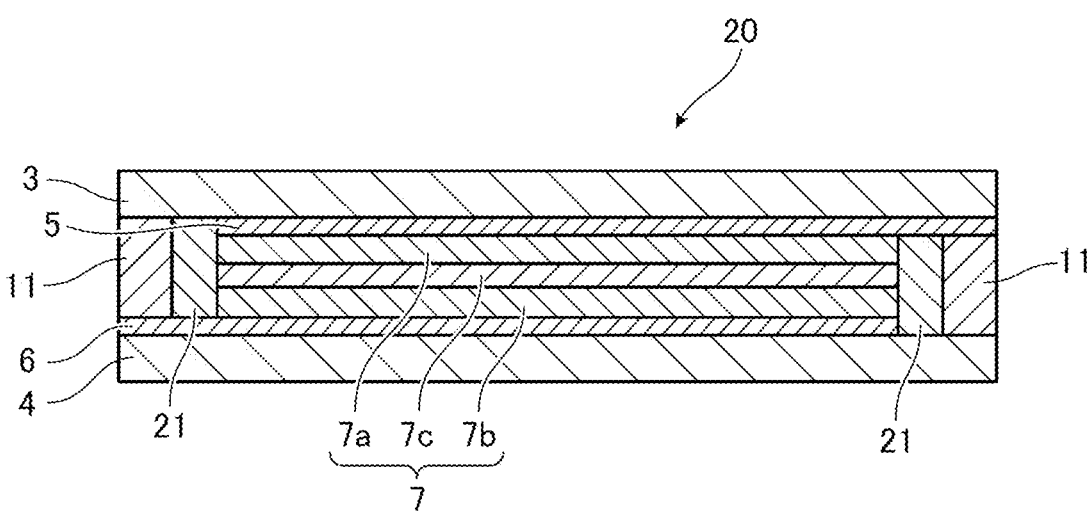
FIG. 2 is a schematic cross-sectional view of an electrochromic element according to a second embodiment of the present invention.

FIG. 2 is a schematic cross-sectional view of an electrochromic element 20 according to a second embodiment of the present invention.

The electrochromic element 20 according to the second embodiment shown in FIG. 2 differs from FIG. 1 in that a sealing layer 21 for sealing between the pair of substrates 3 and 4 and the barrier layer 11 are separately arranged. The sealing layer 21 has weaker gas barrier properties but better adhesive properties (seal strength) than the barrier layer 11, and on the other hand, the barrier layer 11 has weaker adhesive properties (seal strength) but better gas barrier properties than the sealing layer 21. Alternatively, the barrier layer 11 may have the same adhesive properties as the sealing layer 21.

In FIG. 2, the sealing layer 21 is arranged on the inside surrounding the electrochromic layer 7, and the barrier layer 11 is arranged outside the sealing layer 21, and their arrangements may be switched.

In addition, in FIG. 2, although the barrier layer 11 and the sealing layer 21 are adjacent to each other, some space may exist between the barrier layer 11 and the sealing layer 21.

In the configuration shown in FIG. 2, an optimal material can be selected for each layer so that respective properties such as adhesive properties of the sealing layer 21 and gas barrier properties of the barrier layer 11 can be appropriately obtained in separate layers and it is possible to effectively improve both gas barrier properties and adhesive properties.

According to the embodiment shown in FIG. 2, it is possible to prevent water or oxygen from entering the electrochromic layer 7 from the side of the electrochromic element 10, it is possible to obtain good responsiveness, and it is possible to bring the pair of substrates 3 and 4 into close contact with each other appropriately.

Examples of adhesives applicable to the present embodiment include i) urea resin adhesives, ii) melamine resin adhesives, iii) phenolic resin adhesives, iv) solvent adhesives such as vinyl acetate adhesives and rubber adhesives, v) aqueous adhesives such as vinyl acetate resin emulsion adhesives, vinyl acetate copolymer resin emulsion adhesives, acrylic resin emulsion adhesives, aqueous polymeric isocyanate adhesives, and synthetic rubber latex adhesives, vi) hot melt adhesives, vii) reactive adhesives such as epoxy resin adhesives, cyanoacrylate adhesives, polyurethane adhesives, and acrylic resin adhesives, viii) modified silicone resin adhesives, ix) silylated urethane adhesives, and x) inorganic adhesives such as flint glass and low-melting-point metals.

The above adhesive can be applied not only for the sealing layer 21 but also for the barrier layer 11. However, when used for the barrier layer 11, it is preferable to disperse inorganic fine particles such as zinc oxide, silicon oxide, titanium oxide, and zirconium oxide or fluorine powders such as acrylic resin powder, epoxy powder, polyester, and PTFE to improve barrier properties. In this case, the average particle size of dispersed particles is preferably 10 nm to 100 μm and more preferably 100 nm to 50 μm. In addition, in consideration of the adhesive strength, it is preferable to use a reactive adhesive, and in consideration of barrier properties, it is preferable to use a reactive adhesive and an inorganic adhesive.

Applications

Although applications of the electrochromic element of the present embodiment are not limited, it can be preferably applied to a light control lens for spectacles.

The electrochromic element of the present embodiment may be applied to those other than the lens for spectacles. Examples thereof include electrochromic light control devices and anti-glare mirrors.

Method of Producing Electrochromic Element in Present Embodiment

Figure 4:
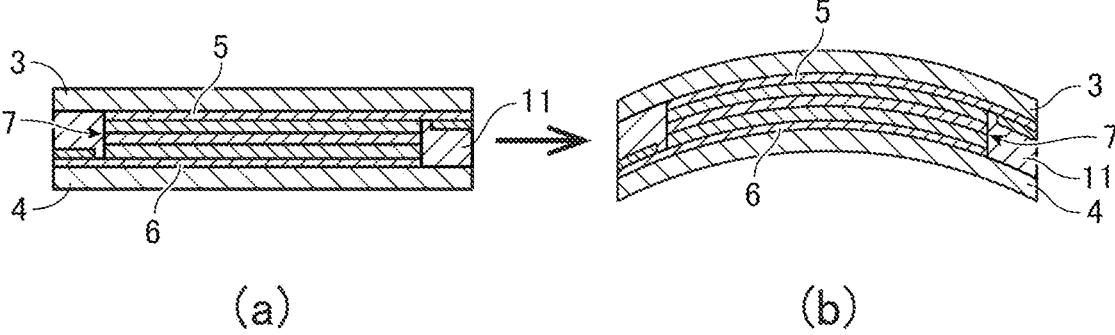
FIG. 4 is an illustrative diagram showing a process of producing an electrochromic element according to an embodiment of the present invention.

FIG. 4 is an illustrative diagram showing a method of producing an electrochromic element according to the present embodiment.

In FIG. 4(a), the circumference of the electrochromic layer 7 arranged between the pair of substrates 3 and 4 having the electrode layers 5 and 6 on their inner surfaces is surrounded by the barrier layer 11. For example, when the pair of substrates 3 and 4 are bonded, the barrier layer 11 is formed in advance around the electrochromic layer 7 formed on the side of at least one substrate, and the side of the other substrate is bonded. In this case, a heat treatment, a UV treatment or the like is performed, the barrier layer 11 is cured, and thus the pair of substrates 3 and 4 are bonded together with the barrier layer 11 therebetween.

As shown in FIG. 2, even when the barrier layer 11 and the sealing layer 21 are separately provided, the pair of substrates 3 and 4 can be bonded together with the barrier layer 11 and the sealing layer 21 therebetween using the same method as above. For example, when the barrier layer 11 is formed on the side of one substrate and the sealing layer 21 is arranged on the side of the other substrate, it is possible to bond the pair of substrates 3 and 4 together.

In the present embodiment, as shown in FIG. 4(b), the electrochromic element 10 can be bent into a curved shape. As described above, the electrochromic element 10 can be applied to the lens for spectacles, and in this case, the electrochromic element 10 is formed into a 3D curved surface. A lens for spectacles can be produced by arranging the electrochromic element 10 in a mold (not shown) and molding a support, which is a lens substrate, on one surface of the electrochromic element 10.

In the present embodiment, in the process of producing an electrochromic element, it is possible to form a barrier layer in the process of bonding the pair of substrates 3 and 4, and it is possible to produce an electrochromic element having excellent gas barrier properties without complicating the producing process.

EXAMPLES

Hereinafter, the present embodiment will be described in more detail with reference to examples and comparative examples.

In the experiment, the following laminate was formed using an adhesive, and the water vapor transmission rate (WVTR) and the $O_2$ transmittance were determined.

<Laminate>

An adhesive was applied to a 100 μm polycarbonate film, a 100 μm polycarbonate film was additionally laminated to form a polycarbonate film/adhesive/polycarbonate film laminate.

Using the laminate, the water vapor transmission rate and the $O_2$ transmittance were determined. The water vapor transmission rate and the $O_2$ transmittance were measured by the Mocon method (JIS K 7129 (B)). The water vapor transmission rate (WVTR) was measured under an atmosphere of a temperature of 40° C. and a humidity of 90% RH. The $O_2$ transmittance was measured under an atmosphere of a temperature of 20° C. and a humidity of 65% RH.

<Adhesive (1)>

A laminate was formed using an acrylic resin-based adhesive as the adhesive (1). The laminate using the adhesive (1) had a water vapor transmission rate (WVTR) of about 50 (g/m²·day) and an $O_2$ transmittance of about 55 (cc/m²·day·atm).

<Adhesive (2)>

A laminate was formed using an epoxy resin-based adhesive as the adhesive (2). The laminate using the adhesive (2) had a water vapor transmission rate (WVTR) of about 25 (g/m²·day) and an $O_2$ transmittance of about 30 (cc/m²·day·atm).

<Adhesive (3)>

A laminate was formed using an adhesive in which 35 wt % of PTFE powder particles with an average particle size of 2 μm were dispersed in an acrylic resin-based adhesive as the adhesive (3). The laminate using the adhesive (3) had a water vapor transmission rate (WVTR) of about 5 (g/m²·day) and an $O_2$ transmittance of about 15 (cc/m²·day·atm).

<Adhesive (4)>

A laminate was formed using an adhesive in which 25 wt % of silica powder particles with an average particle size of 20 μm were dispersed in an epoxy resin-based adhesive as the adhesive (4). The laminate using the adhesive (4) had a water vapor transmission rate (WVTR) of about 5 (g/m²·day) and an $O_2$ transmittance of about 10 (cc/m²·day·atm).

<Adhesive (5)>

A laminate was formed using a vinyl acetate-based adhesive as the adhesive (5). The laminate using the adhesive (5) had a water vapor transmission rate (WVTR) of about 155 (g/m²·day) and an $O_2$ transmittance of about 80 (cc/m²·day·atm).

Experimental Example 1

An electrochromic element having the configuration shown in FIG. 1 was formed. The adhesive (1) was used as the adhesive between the substrates 3 and 4.

Experimental Example 2

An electrochromic element having the configuration shown in FIG. 1 was formed. The adhesive (2) was used as the adhesive between the substrates 3 and 4.

Experimental Example 3

An electrochromic element having the configuration shown in FIG. 1 was formed. The adhesive (3) was used as the adhesive between the substrates 3 and 4.

Experimental Example 4

An electrochromic element having the configuration shown in FIG. 2 was formed. As the adhesive between the substrates 3 and 4, an epoxy resin-based adhesive was used for the sealing layer 21, and an adhesive (3) was used for the barrier layer 11.

Experimental Example 5

An electrochromic element having the configuration shown in FIG. 2 was formed. As the adhesive between the substrates 3 and 4, a vinyl acetate-based adhesive was used for the sealing layer 21, and an adhesive (4) was used for the barrier layer 11.

Experimental Example 6

An electrochromic element having the configuration shown in FIG. 1 was formed. The adhesive (5) was used as the adhesive between the substrates 3 and 4.

<Visual Examination>

In Experimental Example 1, after the sample was left in a constant temperature and humidity layer, slight coloring unevenness occurred at the ends during current application, but was not to a level that would cause problems in practical use.

In Experimental Example 2, after the sample was left in a constant temperature and humidity layer, slight coloring unevenness occurred at the ends during current application, but it was better than Example 1 and was not to a level that would cause problems in practical use.

In Experimental Example 3 to Experimental Example 5, no change was observed before and after the sample was left in a constant temperature and humidity layer, during current application, the entire sample was uniformly colored, and favorable results were obtained.

In Experimental Example 6, the color at the ends during current application coloring was faded, a strong gradation appeared, and the sample was determined to be unusable. This was thought to be due to changes such as entering of water, oxygen and the like from the ends and deterioration of the electrochromic material.

Based on the experiment results, Experimental Example 1 to Experimental Example 5 were taken as examples, and Experimental Example 6 was taken as a comparative example. In addition, it can be understood that Example 3 to Example 5 among the examples were better.

INDUSTRIAL APPLICABILITY

Since the electrochromic element of the present invention has excellent gas barrier properties, when the electrochromic element is used as, for example, a lens for light control spectacles, it is possible to obtain a feeling of use with excellent responsiveness.

Priority is claimed on Japanese Patent Application No. 2021-082861, filed May 17, 2021, the content of which is incorporated herein by reference.

The invention claimed is:

1. An electrochromic element comprising a pair of substrates, a pair of electrode layers provided on inner surfaces of the pair of substrates, and an electrochromic layer arranged between the electrode layers, wherein opposite ends of each of the pair of substrates extend outward beyond side surfaces of the electrochromic layer, wherein a barrier layer surrounding the electrochromic layer is provided, wherein the barrier layer and a sealing layer for sealing between the pair of substrates are separately provided, wherein the barrier layer has higher gas barrier properties than the sealing layer, wherein the sealing layer has higher adhesiveness than the barrier layer, and wherein the sealing layer is in contact with the electrochromic layer on an inner side surrounding the electrochromic layer, and the barrier layer is arranged outside the sealing layer.

2. The electrochromic element according to claim 1, wherein the barrier layer is formed of a material having a higher electrical resistivity than the electrode layers.

3. The electrochromic element according to claim 1, wherein the barrier layer is formed of a UV curing resin, a thermosetting resin, or a low-melting-point material.

4. A lens for spectacles including the electrochromic element according to claim 1.

\* \* \* \* \*